United States Patent [19]

Noven

[11] Patent Number: 5,809,501
[45] Date of Patent: Sep. 15, 1998

[54] METHOD AND SYSTEM OF DATABASE MANAGEMENT IN AN ASYNCHRONOUS TRANSFER MODE (ATM) ENVIRONMENT

[75] Inventor: Geir Åge Noven, Finstadjordet, Norway

[73] Assignee: Telefonaktiebolaget L M Ericsson (publ), Stockholm, Sweden

[21] Appl. No.: 593,497

[22] Filed: Jan. 30, 1996

[51] Int. Cl.⁶ .................................................. G06F 17/30
[52] U.S. Cl. ............................................. 707/7; 707/104
[58] Field of Search .................................. 395/607, 615; 370/395, 396, 397, 398, 399; 707/7, 104

[56] References Cited

U.S. PATENT DOCUMENTS

| T972,003 | 7/1978 | Coleman, Jr. | 707/7 |
|---|---|---|---|
| 3,611,316 | 10/1971 | Woodrum | 707/7 |
| 4,510,567 | 4/1985 | Chang et al. | 707/7 |
| 4,809,158 | 2/1989 | McCauley | 395/607 |
| 4,882,699 | 11/1989 | Evensen | 379/284 |
| 5,089,985 | 2/1992 | Chang et al. | 707/2 |
| 5,179,698 | 1/1993 | Bachman et al. | 707/4 |
| 5,321,843 | 6/1994 | Shoji et al. | 707/3 |
| 5,323,389 | 6/1994 | Bitz et al. | 370/397 |
| 5,355,474 | 10/1994 | Thuraisngham et al. | 707/9 |
| 5,414,701 | 5/1995 | Shtayer et al. | 370/395 |
| 5,414,704 | 5/1995 | Spinney | 370/389 |
| 5,467,349 | 11/1995 | Huey et al. | 370/60.1 |
| 5,487,164 | 1/1996 | Krischofer et al. | 395/607 |
| 5,502,723 | 3/1996 | Sanders | 370/352 |
| 5,615,366 | 3/1997 | Hansen | 395/607 |
| 5,621,728 | 4/1997 | Lightfoot | 395/60.1 |
| 5,649,109 | 7/1997 | Griesmer | 395/200.17 |

FOREIGN PATENT DOCUMENTS

| 0 594 196 A1 | 4/1994 | European Pat. Off. |
| WO 95/23380 | 8/1995 | WIPO . |

OTHER PUBLICATIONS

Data Structures from Arrays to Priority Queues by Wayne Amsbury: Wadsworth, Inc, Belmont, CA 94002, 1985.

Donald E. Knuth, 3 *The Art of Computer Programming* 106–11, 406–14 & 506–49 (Addison–Wesley 1973).

Stephen C. Farkouh, Managing ATM–Based Broadband Networks, 31 IEEE Communications 82–86 (IEEE May 1993).

Alfred V. Aho, John E. Hopcroft & Jeffrey D. Ullman, Sorting and Storing Information in Files, Data Structures and Algorithms 253–260 & 361–368 (Addison–Wesley 1983).

(List continued on next page.)

*Primary Examiner*—Paul R. Lintz
*Assistant Examiner*—Diane D. Mizrahi
*Attorney, Agent, or Firm*—Jenkens & Gilchrist, A Professional Corporation

[57] ABSTRACT

A system and method for the efficient execution of interleaved lookup and edit requests received by a connection database in an ATM exchange is described. The global address of an ATM cell is mapped to a smaller, equipment-specific local address using a connection database stored in each local exchange. When an ATM cell arrives at an ATM exchange, lookup request is sent to the connection database along with the global address values. Since the database operating system accords high priority to these lookup requests, the connection database temporarily suspends execution of all other tasks and return the local address of the ATM cell. A modified binary search algorithm is used for executing the interrupt-driven local address lookup requests. Entries in the connection database continually need to be added, deleted, replaced or verified. Efficient execution of these management tasks can be facilitated by maintaining the database in a sorted order using a modified bubblesort algorithm. Sort requests are interleaved with lookup requests in such a way as to permit lookup requests to preempt sort requests in execution priority without imposing additional computational costs because of the interruption.

26 Claims, 8 Drawing Sheets

| ADDRESS | VPI | VCI | PATH | |
|---|---|---|---|---|
| 0 | 5A6 | FFFF | 1 | |
| 1 | 5BB | FFFF | 1 | |
| 2 | 791 | 7000 | 0 | |
| 3 | 791 | 7001 | 0 | |
| 4 | 791 | 7002 | 0 | |
| 5 | A56 | FFFF | 1 | <- j |
| 6 | A56 | FFFF | 1 | <- i |
| 7 | FFF | FFFF | 1 | <- t |
| 8 | FFF | FFFF | 1 | |

OTHER PUBLICATIONS

*Bellcore*, "Synchronous Optical Network (*Sonet*) *Transport Systems: Common Generic Criteria*", Technical Advisory, Issue 8, Oct. 1993.

*Stephen C. Farkouh*, "*Managing ATM Based Broadband Networks*", Microcell Technology, IEEE Communications Magazine, vol. 31, No. 5, May 1993.

*International Telecommunication Union*, "B–ISDN Asynchronous Transfer Mode Functional Characteristics", ITU–T 1.150, Mar. 1993.

*International Telecommunication Union, "ISDN Protocol Reference Model"*, ITU–T 1.320, Nov. 93.

*International Telecommunication Union,* "B–ISDN Protocal Reference Model and its Application", Integrated Services Digital Network (ISDN), Recommendation 1.321, Geneva, 1991.

*International Telecommunication Union*, "B–ISDN ATM Layer Specification", Integrated Services Digital Network (ISDN) Overall Network Aspects and Functions, ITU–T 1.361, Mar. 93.

*International Telecommunication Union*, "B–ISDN ATM Adaptation Layer (AAL) Specification", Integrated Services Digital Network (ISDN) Overall Network Aspects and Functions, ITU–T Recommendation 1.363, Mar. 1993.

FIG. 11a

| ADDRESS | VPI | VCI | PATH | |
|---|---|---|---|---|
| 0 | 5A6 | FFFF | 1 | |
| 1 | 5BB | FFFF | 1 | |
| 2 | 791 | 7000 | 0 | |
| 3 | 791 | 7001 | 0 | |
| 4 | 791 | 7002 | 0 | |
| 5 | A56 | FFFF | 1 | <- j |
| 6 | A56 | FFFF | 1 | <- i |
| 7 | FFF | FFFF | 1 | <- t |
| 8 | FFF | FFFF | 1 | |

FIG. 11b

| ADDRESS | VPI | VCI | PATH | |
|---|---|---|---|---|
| 0 | 5A6 | FFFF | 1 | |
| 1 | 5BB | FFFF | 1 | |
| 2 | 791 | 7000 | 0 | |
| 3 | 791 | 7001 | 0 | |
| 4 | 791 | 7002 | 0 | <- j |
| 5 | 791 | 7002 | 0 | <- i |
| 6 | A56 | FFFF | 1 | |
| 7 | FFF | FFFF | 1 | <- t |
| 8 | FFF | FFFF | 1 | |

FIG. 11c

| ADDRESS | VPI | VCI | PATH | |
|---|---|---|---|---|
| 0 | 5A6 | FFFF | 1 | |
| 1 | 5BB | FFFF | 1 | <- j |
| 2 | 5BB | FFFF | 1 | <- i |
| 3 | 791 | 7000 | 0 | |
| 4 | 791 | 7001 | 0 | |
| 5 | 791 | 7002 | 0 | |
| 6 | A56 | FFFF | 1 | |
| 7 | FFF | FFFF | 1 | <- t |
| 8 | FFF | FFFF | 1 | |

FIG. 11d

| ADDRESS | VPI | VCI | PATH | |
|---|---|---|---|---|
| 0 | 5A6 | FFFF | 1 | |
| 1 | 5BB | FFFF | 1 | <- j |
| 2 | 5C0 | 0001 | 0 | <- i |
| 3 | 791 | 7000 | 0 | |
| 4 | 791 | 7001 | 0 | |
| 5 | 791 | 7002 | 0 | |
| 6 | A56 | FFFF | 1 | |
| 7 | FFF | FFFF | 1 | <- t |
| 8 | FFF | FFFF | 1 | |

METHOD AND SYSTEM OF DATABASE MANAGEMENT IN AN ASYNCHRONOUS TRANSFER MODE (ATM) ENVIRONMENT

DESCRIPTION

1. Technical Field of the Invention

The invention relates to electronic data switching systems, and more particularly, to an efficient technique for management of connection information databases in ATM switching systems.

2. Description of Related Art

The demand for telecommunications services has been growing at an ever-increasing rate. In order to meet this demand, telecommunications network operators and suppliers have had to continuously upgrade the traffic carrying capacity of both their circuits as well of as the switch nodes interconnecting those circuits. Moreover, the demand for ordinary voice telephone service is becoming a decreasingly smaller part of the overall traffic demand in comparison to other telecommunications services such as data communications between computers, graphical image transmissions, video-conferencing and similar broadband services.

Current and future telecommunications subscribers, both residential and business, will be connected, via common accesses, to a web of broadband networks operating at data rates of 150 megabits per second or above and which can support a wide range of different types of broadband services. Broadband networks may be generally defined as those which support user services requiring bit transfer rates substantially in excess of one megabit per second.

In general, broadband networks are likely to be built using Asynchronous Transfer Mode (ATM) technology as the underlying type of transport and switching technology. Broadband Integrated Services Digital Networks (B-ISDN), employing ATM technology can offer users the flexibility and capacity necessary to support diverse telecommunication services ranging from basic voice telephone service to high speed data transfer, video telephony, and high-quality television signal distribution. As further described below, ATM technology relies upon the compartmentalization of data into packets or cells which are transmitted and switched as individual units through the various nodes in the broadband network.

Current large telephone central offices may serve up to 100,000 customers. Based upon such a large number of terminals, a future B-ISDN central office may be required to operate at a switching capacity of up to one terabit per second ($10^{12}$ bits per second) or greater. Assuming that each customer is served with a B-ISDN line operating at the design throughput level of 155.52 megabits per second, an ATM exchange switch needs to be able to handle a throughput in excess of 15 terabits per second.

Data is transmitted in ATM systems in the form of "cells" that are 53 octets long. Each ATM cell comprises a five octet "header" segment followed by a forty-eight octet "payload" segment. The header segment of an ATM cell contains information relating to the routing of the data contained in the payload segment. The header segment also contains traffic control information. Eight or twelve bits of the header segment contain the Virtual Path Identifier (VPI), and sixteen bits of the header segment contain the Virtual Channel Identifier (VCI).

Each ATM exchange translates the abstract routing information represented by the VPI and VCI bits into the addresses of physical or logical network links and routes each ATM cell appropriately. Since, on the average, the time duration of activity on each virtual path and each virtual channel is longer than the length of a single cell, it is computationally more efficient if the translation tables that correlate the VPI and VCI information to physical or logical network links are stored in a database in the ATM exchange.

The entries in the database of connection information need to be added, revised or deleted every time a connection is added, modified or taken down. These operations are collectively referred to hereinafter as database editing operations. Further, every time an ATM cell is received, the VPI and VCI values in the header segment of that cell need to be translated into routing information pertaining to physical or logical network links. This operation is referred to hereinafter as a database lookup operation.

During the operation of an ATM exchange, the connection information database needs to be concurrently available for both editing as well as for lookup. Under ordinary operating conditions, lookup requests to the database are likely to be much more numerous than database editing operations. However, database editing operations are generally more complex than database lookup operations. Computational efficiency considerations mandate that the database be organized in such a manner that database lookup requests are handled expeditiously without letting any pending database editing operations get too backlogged.

An ATM link operating at 155.52 megabits per second (the STM-1 rate) handles over 365,000 ATM cells every second. Since an ATM exchange is likely to have multiple incoming and outgoing links operating at the STM-1 rate, it is possible for the connection database to get over one million lookup requests a second. Since database lookup requests are so frequent, it is important for the database to be continually sorted, especially if a binary search algorithm is to be used for handling lookup requests. If the cell-bandwidth-averaged duration of each connection were one minute, then the connection database will have about one million entries that would have to be replaced or revised once every minute. Since frequent database edit operations are thus likely, there is a great need for efficient techniques to manage an ATM connection database.

It is well known to use a search technique called the binary search technique to locate an item in a sorted list. See, e.g., Donald E. Knuth, 3 THE ART OF COMPUTER PROGRAMMING 406–14 (Addison-Wesley 1973). The binary search technique has been used to implement the lookup algorithm in the present invention. It is likewise well known to use a sorting technique called bubblesort to efficiently sort items in a list. See, e.g., Donald E. Knuth, 3 THE ART OF COMPUTER PROGRAMING 106–11 (Addison-Wesley 1973). The bubblesort technique has been used to implement the editing algorithm in the present invention.

ATM standardization papers have not proposed any specific methods or mechanisms for database management in ATM exchanges. The principal alternative to the database management technique that is disclosed in the present invention is to use "hashing". Hashing involves the translation of database entries using a hash function into values spanning a compact range. Hashing can reduce the storage needed for storing database entries and may also permits relatively fast searching. A detailed description of hashing and hash functions can be found in Donald E. Knuth, 3 THE ART OF COMPUTER PROGRAMMING 506–49 (Addison-Wesley 1973).

However, hashing and other similar database management techniques suffer from a number of disadvantages. For example, hashing is memory inefficient and search, storage and retrieval times can be indeterminate whenever multiple entries map (at least initially) to the same hashed value. Hashing techniques show themselves in the best light when their performance is evaluated using probabilistic measures. However, the performance of hashing algorithms in "worst-case" scenarios is quite poor. For example, a new entry may fail to be entered, or the retrieval time for an entry may be too long to permit "on the fly" lookup.

In time critical telecommunications applications, it is important for search, storage and retrieval times to be bounded. The method and system of the present invention is superior to hashing techniques because its memory requirements are quite modest and because the algorithm is relatively simple. Because of the limited storage and power requirements, it is easier to implement the present method on a custom chip.

It should be noted that neither the binary search nor the bubblesort methods are per se new. However, there have been no teachings suggesting the use of the binary search and the bubblesort methods to manage a database in an ATM exchange.

The system and method of the present invention combines these two well-known solution algorithms to create an ATM database management technique that is startling in its simplicity as well as being computationally efficient in its operation and use of system resources. The system and method of the present invention permits the efficient multiplexing and demultiplexing of ATM cells.

SUMMARY OF THE INVENTION

Therefore, it is a primary object of the present invention to permit the efficient execution of interleaved lookup and edit requests received by the connection database in an ATM exchange.

In one embodiment of the present invention, the 24-bit or 28-bit global address of an ATM cell is mapped to a smaller, equipment-specific local address that is 12-bits long. This mapping is performed using a connection database stored in each local exchange. When an ATM cell arrives at an ATM exchange port, an interrupt signal is generated that causes a lookup request to be sent to the connection database along with the global address values as parameters. When the connection database receives a lookup request with these parameters, it temporarily suspends whatever other tasks it is performing and determines the local address corresponding to the global address values received. Thus the system and method of the present invention facilitates the interrupt-driven ("on the fly") lookup of the local address of each arriving ATM cell. A modified binary search algorithm is used for executing the address lookup requests.

Entries in the connection database continually need to be added, deleted, replaced or verified. The system and method of the present invention aids in the execution of these database management tasks. Efficient operation of these management tasks is made easier if the database is maintained in a sorted order. It should be noted that keeping the database in sorted order is not only efficient, but is also essential for the proper operation of the lookup and the management algorithms of the present invention. In one embodiment of the system and method of the present invention, a modified bubblesort algorithm is used for sorting the entries in the connection database.

Sort requests using this modified bubblesort algorithm can be interleaved with lookup requests using a modified binary search algorithm in a manner that permits lookup requests to preempt sort requests in execution priority while permitting interrupted sort requests to be resumed without imposing additional computational costs because of the interruption.

In one aspect, the present invention relates to a system and method for managing a connection information database in an asynchronous transfer mode (ATM) exchange. The global address of an ATM cell is first mapped to a local address that is specific to an ATM exchange port. A binary search algorithm is then used to look up entries in the database. A modified bubblesort algorithm is used to add data entries to the database. The data entry algorithm performs its function by moving a dummy data record to the correct spot in the database while constantly retaining the database in a fully sorted state. A modified bubblesort algorithm is used to delete data entries in the database. The data deletion algorithm is capable of deleting data entries while maintaining the database in a fully sorted order.

BRIEF DESCRIPTION OF THE DRAWINGS

A more complete understanding of the method and system of the present invention may be obtained by reference of the detailed description of the preferred embodiments that follows, taken in conjunction with the accompanying drawings, wherein:

FIG. 11 illustrates the stages in the data entry sequence for a data base containing six data records.

DESCRIPTION OF THE PREFERRED EMBODIMENT

Telecommunications Networks

Figure 1:
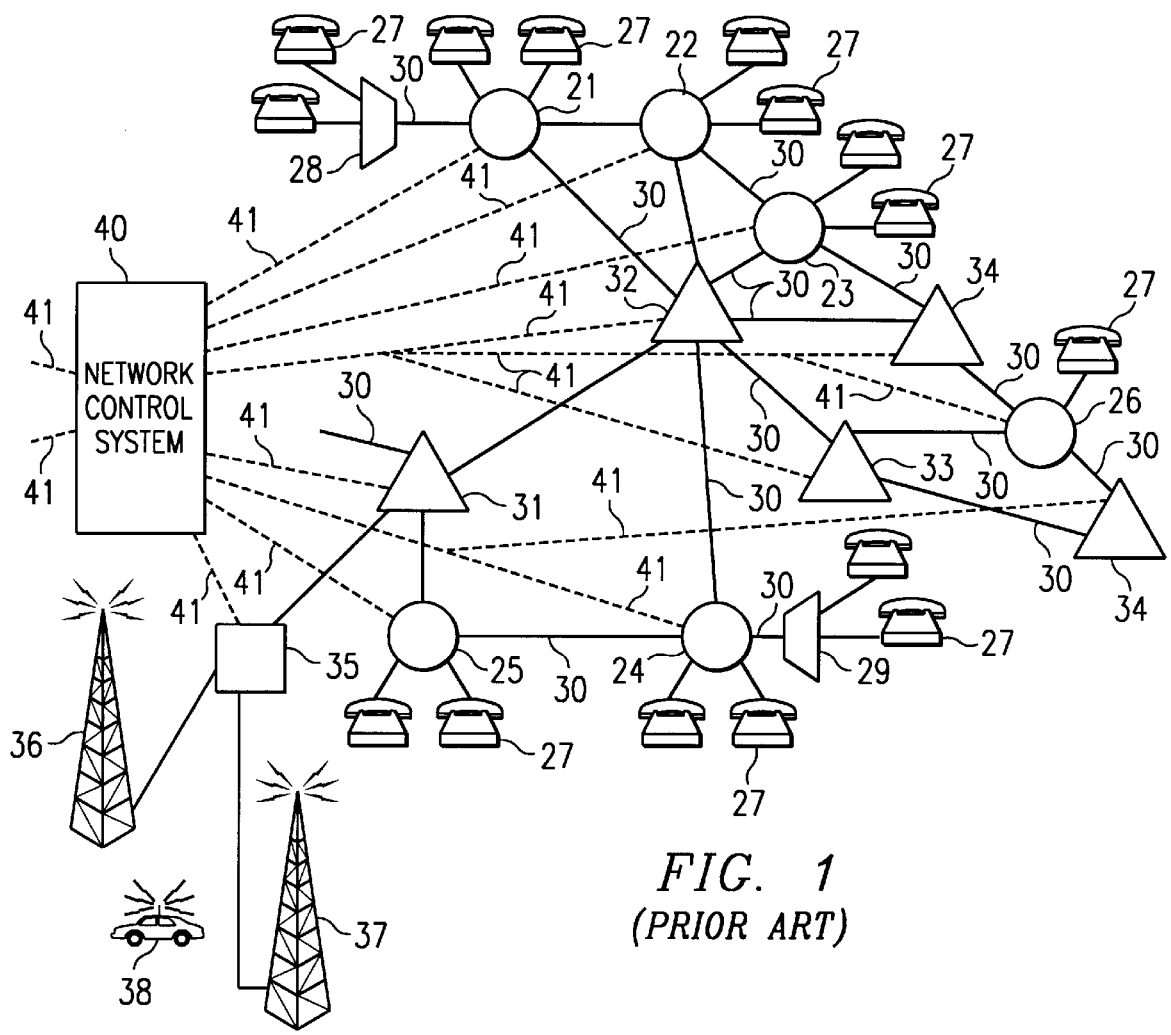
FIG. 1 is a block diagram of an illustrative telecommunications network within which the data switching system of the present invention may be employed.

Referring first to FIG. 1, there is shown an illustrative schematic diagram of a conventional public telecommunications network including a plurality of local exchanges 21 to 26, each of which have a plurality of local subscribers connected thereto and represented by telephone instruments 27. Two of the local exchanges 21 and 24 are represented as having remote subscriber multiplex stages 28 and 29 associated therewith which, in turn, have local customers 27 connected thereto. The network of FIG. 1 also includes a plurality of trunking exchanges 31 to 34 which serve primarily to interconnect various local exchanges with one another and to provide routes between various parts of the network. Trunk exchange 31 is shown connected to a mobile exchange 35 which includes a pair of illustrative base stations 36 and 37 serving a plurality of mobile radio telephone subscribers represented at 38.

In addition, other telecommunications services such as databases and intelligent networks may also be connected to various ones of the exchanges shown. Between each of the exchanges 21 to 35 in the network, there are shown a plurality of communication paths 30, each of which may comprise a plurality of communication circuits, including cables, optical links or radio links for carrying voice and/or data communication between the various exchanges within the network.

The network of FIG. 1 also includes a network control system 40 which is connected to each of the exchanges 21 to 35 within the network by means of communication links 41 (represented by dotted lines) for the transmission of control signals to each exchange and for the reception of traffic data from each exchange. The network control system 40 issues commands to dynamically reconfigure the communication paths within the various traffic routes of the network as well as to control the alarm systems within the exchanges of the network in order to fine tune the alleviation of congestion conditions within the network.

ATM System Concepts

As discussed above, numerous changes are currently taking place within the public telecommunications transport networks being implemented. Operators of public telecommunications networks have long sought to deploy a single type of technology to handle the transport and switching of all types of telecommunications services within a common infrastructure. One such technology is Asynchronous Transfer Mode (ATM) technology.

ATM is currently being implemented in an attempt to satisfy these needs by creating a bearer telecommunications network which has substantial "bandwidth granularity" and which is capable of coping with very high bandwidth connections. The term "bandwidth granularity" refers to a characteristic of a network that can handle calls whose bandwidth requirements continually vary over a wide range during the duration of a call.

The use of ATM technology in the public telecommunications network provides the capabilities of common switching and transport for related services, increased bandwidth granularity, support of variable-bit-rate services, and support of multimedia services. Because of these features, ATM has been chosen by the International Telecommunications Union (ITU) (formerly known as the International Telegraph and Telephone Consultative Committee (CCITT)) as the core technology for broadband ISDN (B-ISDN) services. This is despite the disadvantages of ATM, including transit delays for low speed isochronous services, added complexity within a network, and the introduction of new performance parameters (such as cell-loss and congestion), with which the system of the present invention deals, as will be further set forth below.

An ATM network may be implemented using either plesiochronous digital hierarchy (PDH) or synchronous digital hierarchy (SDH), or both. Moreover, pure ATM may be used as the bearer for a network whenever the limitations arising from multiple conversions between ATM and STM (synchronous transfer mode) and the resultant performance degradations can be dealt with.

Figure 2:
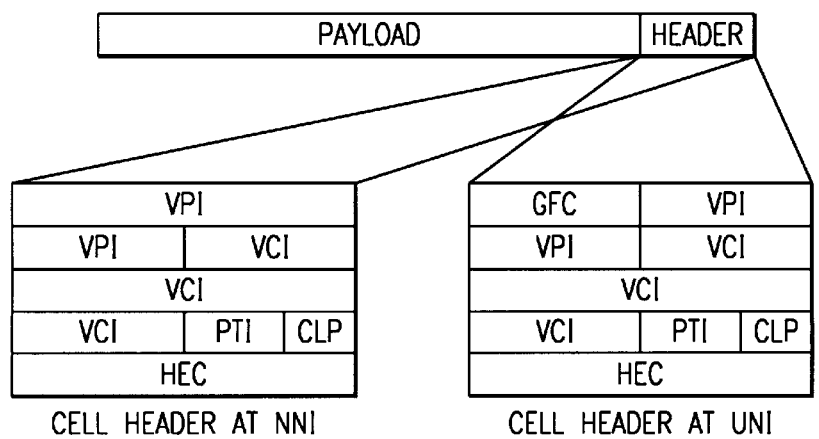
FIG. 2 is a block diagram illustrating an exemplary ATM cell structure.

The ATM cell structure shown in FIG. 2 is at the heart of ATM technology. An ATM cell has a fixed length of 53 bytes, or octets, divided into a 5-octet header and a 48-octet information field (also known as the payload). The ATM cell header is structured as a number field and one of its main functions is to assist in routing the ATM cell from the point of origin to the point of destination through one or more switching nodes. The information held in each ATM cell is kept relatively small in order to reduce the size of the internal buffers in the switching nodes and to limit the queuing delays in those buffers. ATM operates in a connection-oriented mode. This is important from a modeling viewpoint since it makes it possible to use the results of well-established circuit-switched mathematical models to optimize the allocation and control of network resources.

The principal function of the ATM cell header is the identification of the virtual connection. Routing information within the ATM cell is contained within two fields: a virtual path identifier (VPI), which determines which virtual path the ATM cell belongs to, and a virtual channel identifier (VCI), which determines which virtual channel in the virtual path the cell belongs to.

A virtual channel is a dynamically allocable end-to-end connection. Optical transmission links are capable of transporting hundreds of megabits per second, whereas virtual channels may fill only a few kilobits per second of a link. Thus, a large number of simultaneous virtual channels can be supported on a single transmission link.

A virtual path, on the other hand, is a semi-permanent connection between endpoints. Each of virtual paths can transport a large number of simultaneously-connected virtual channels. Since a large group of virtual channels are handled and switched together as a single unit, the total processing requirements of a virtual path are less than that of a virtual circuit, and consequently there is faster processing per (virtual) circuit, resulting in a significantly more efficient use of network resources. The network management of virtual paths is relatively simple and efficient.

As illustrated in FIG. 2, the ATM cell header is slightly different at the user-network interface (UNI) compared with the network-node interface (NNI). The UNI contains four bits for generic flow control (GFC) and is used to ensure fair and efficient use of available capacity between a terminal and the network. A payload type indicator (PTI) field is used to indicate whether an ATM cell contains user information or special network information, e.g., for maintenance purposes. A cell loss priority (CLP) field encodes a two-level priority and is used when it becomes necessary to discard cells because of network conditions. The header information is protected by a check sum contained within the header error control (HEC) field.

The use of ATM cells permits the information transfer rate to adapt to the actual service requirements. Depending upon the capacity required, the number of cells per unit of time can be increased up to the transmission bit-rate limit of the physical medium used to carry the data. In addition to data cells there are also cells for signaling and maintenance and idle cells. Signaling cells are used between an end user in the network, or between nodes in the network and their function is to set up a service, e.g., a connection. Maintenance cells provide supervision of the ATM layer while idle cells are used to fill the transmission capacity up to the rate of the transmission medium.

Figure 3:
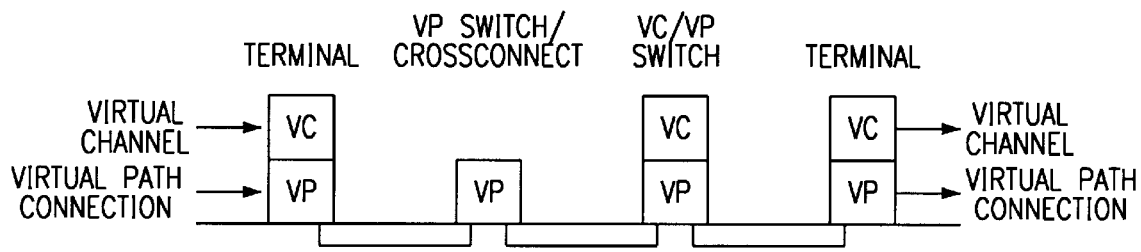
FIG. 3 is a block diagram illustrating a number of interconnected virtual paths and virtual channels within an ATM network.

Referring to FIG. 3, there is shown a block diagram illustrating the switching and cross-connection of virtual channels and virtual paths within an ATM link. From the viewpoint of a switch designer, "VP switching" refers to the switching of an ATM cell using only the upper part of the identifier field, that is, the shorter field (VPI). In contrast, in "VP/VC switching" the entire identifier field (i.e. both the VPI and the VCI) are used to switch an ATM cell.

A VP/VC path consists of a plurality of interconnected VP/VC lengths. Switching and cross-connection can be performed at either the VP or the VC level. The virtual path identifier (VPI) and the virtual channel identifier (VCI) define a two-tier handling and routing structure within the ATM circuitry. From the network architectural standpoint, a virtual path (VP) is a bundle of individual connections, a type of "highway" in the route map of an ATM network. One important task in network management is to allocate the right amount of transmission capacity to each such highway (i.e., a virtual path) in order to optimize network performance. This optimization task is the objective of bandwidth management or virtual path dimensioning techniques.

Figure 4:
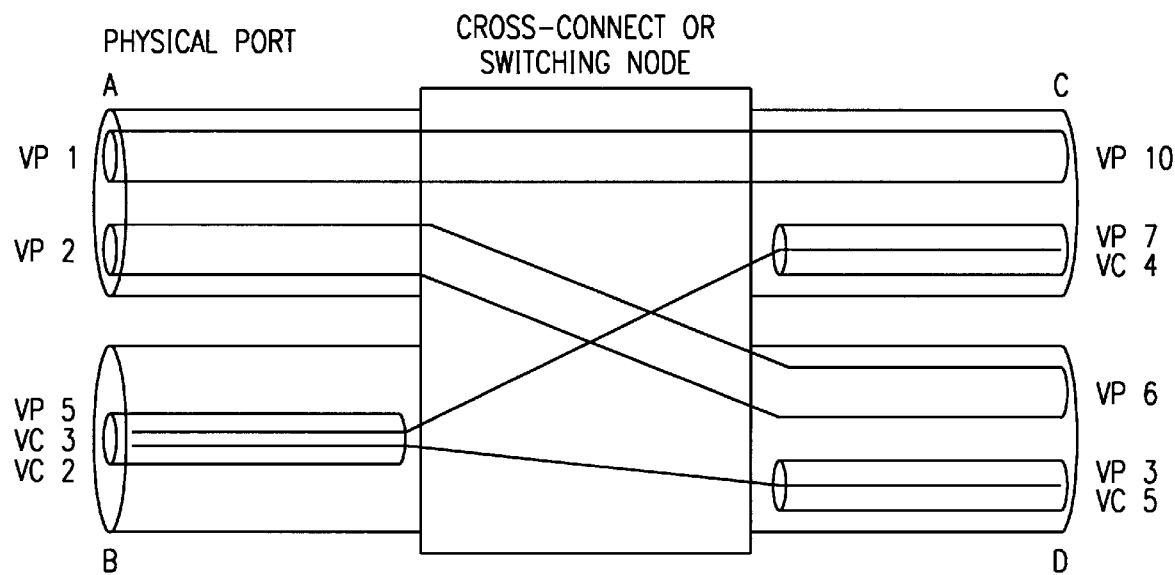
FIG. 4 is a block diagram illustrating the cross-connection and switching of virtual paths and virtual channels within an ATM network.

FIG. 4 illustrates the concepts of virtual path and virtual channel cross-connection and switching. The virtual path identifier (VPI) and virtual channel identifier (VCI) values are only valid for a specific link. In each cross-connect or switch, new VPI/VCI values are assigned to the cell with the combination of physical port and VPI/VCI values providing the identification for the ATM cell. The routing of an exemplary ATM cell is then performed, with the aid of translation tables such as that illustrated in TABLE 1.

TABLE 1

| CONNECTED-FROM PORT | VPI | VCI | CONNECTED-TO PORT | VPI | VCI |
|---|---|---|---|---|---|
| A | 1 | — | C | 10 | — |
| A | 2 | — | D | 6 | — |
| B | 5 | 3 | C | 7 | 4 |
| B | 5 | 2 | D | 3 | 5 |

An ATM cell is the basic multiplexing unit within an ATM transport system, with each cell or information unit containing its own connection and routing information. This feature enables direct multiplexing or demultiplexing of service channels wherein each channel may carry different bit-rates. Each ATM cell is identified and routed by information contained in the header within the virtual path identifier (VPI) and virtual channel identifier (VCI) fields. As mentioned above, a virtual path (VP) is a bundle of multiplexed circuits between two termination points, e.g., switching systems, Local Area Network (LAN) gateways, or private network gateways. A VP provides a direct logical link between virtual path terminations, with the VPI value identifying the particular virtual path.

As also mentioned above, the virtual connection concept used within ATM technology allows multiple virtual channels (VCs) to be handled as a single unit. Virtual channels with common properties, such as those with the same quality of service (QoS), can be grouped together in bundles that can be transported, processed and managed as one unit. This flexible bundling simplifies the operation and maintenance of an ATM system.

Both virtual paths and virtual channels can be used to provide semi-permanent paths within the ATM network. Routes are established and released from an operation support system by the setting of "path connect tables" in the cross-connect equipment or in the multiplexers along a path. Virtual channels can also be used for on-demand switching with connections being established by signaling either between a user and the network or within the network.

One important characteristic of ATM technology relates to its protocol architecture and is built around the so-called "core-and-edge" principle. The protocol functions specific to the information type being transported, such as retransmissions, flow control, and delay equalization, are performed in terminals at the "edges" of the ATM network. This leaves an efficient, service-independent "core" network, that only includes simple cell-transport and switching functions. Within the ATM nodes in this "core", there is no error checking of the information field nor is there any flow control. The cell information is simply read, the HEC is then used to correct single-bit errors that might affect the address and the cell is then switched towards its destination.

Figure 5:
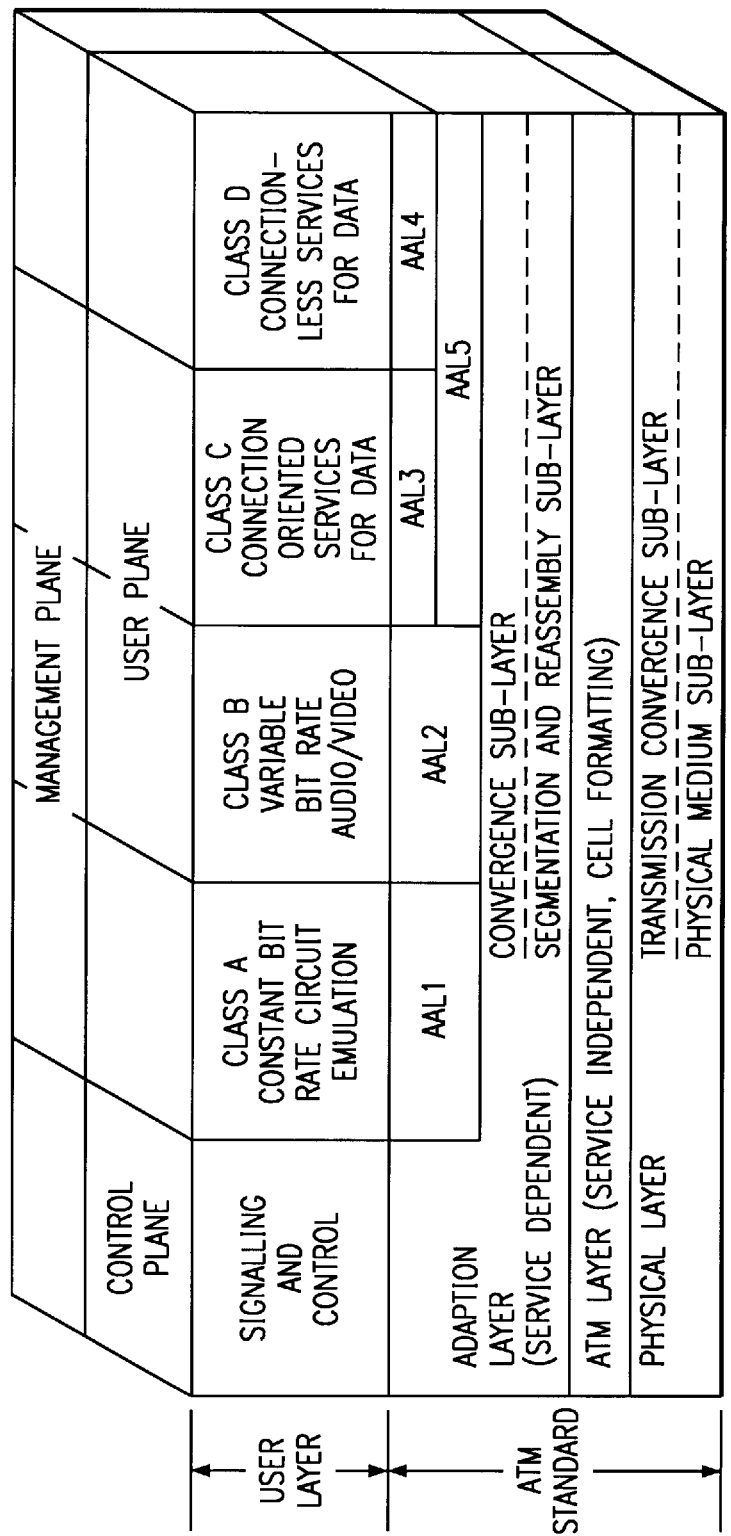
FIG. 5 is a diagram illustrating the CCITT B-ISDN reference model showing the varieties of service classes supported by the standard and the layers of the standard.

An ATM adaptation layer (AAL) is used at the "edge" of the network to enhance the services provided. As shown in FIG. 5, the CCITT reference model for B-ISDN services envisages that the AAL include service dependent functions. As depicted in FIG. 5, there are three layers in the ATM standard. The first layer is the physical layer defining the physical interfaces and framing protocols. The second ATM layer is independent of the physical medium chosen and defines cell structure, provides multiplexing and demultiplexing and VPI/VCI translation to control the flow of cells within the logical network. The third layer is the AAL which provides the important adaptation between the service and the ATM layer thereby allowing service-independent ATM transport. The AAL performs mapping between the original service format and the information field of an ATM cell. Exemplary functions provided by the AAL include variable-length packet delineation, sequence numbering, clock recovery and performance monitoring.

Deployment of ATM in Telecommunications Networks

One use of ATM technology can be within customer premises to support high-speed data communications in and between customer local area networks. In addition, ATM can be used as an infrastructural resource that is common to all services within a customer premises network, including voice and video communications, data transfers and multimedia applications.

An exemplary service for which ATM nodes are introduced into a public telecommunications network is to provide virtual leased line (VLL) service. VLL service is based upon a virtual path concept and allows line capacity to be directly tailored to customer needs and easily changed without modifying the interface structure. A large number of logical connections can be offered to a user through user-network interfaces (UNIs).

In addition, a custom tailored quality of service can also be offered to a customer, matching the needs of the user. Thus, multiple classes of service, quality of service classes and performance parameters can be selected. For example, voice services require low transmission delays but can tolerate high bit-errors, while data communications, on the other hand, are more tolerant of network delays but are sensitive to bit-errors. Thus, the quality of service level of a particular application can be contractually agreed to between a service provider and a customer and audited manually or automatically to ensure compliance.

Figure 6:
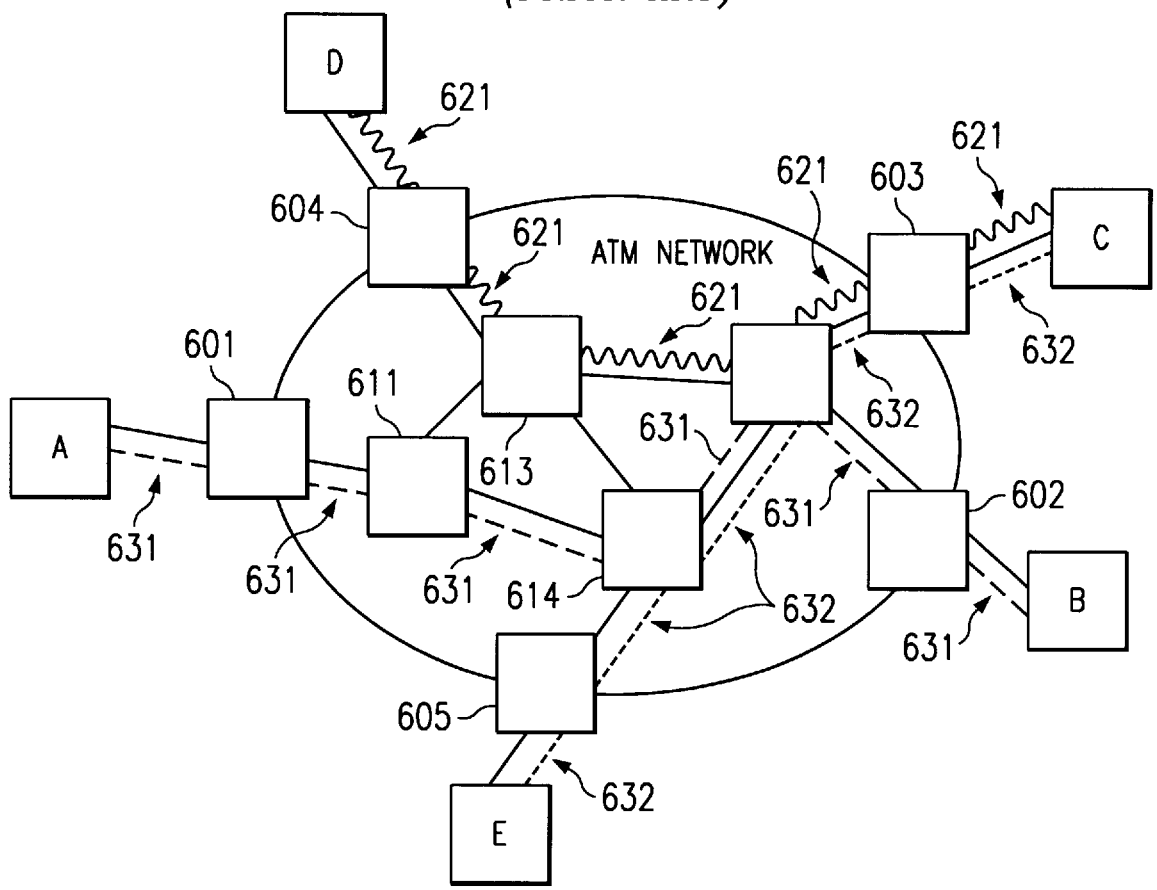
FIG. 6 is a diagram showing an illustrative ATM network providing virtual leased line (VLL) service.

FIG. 6 shows an exemplary virtual channel based VLL service implemented within a ATM network. Network terminals A to E are each coupled through flow enforcement nodes 601 to 605, respectively, to ATM cross-connect nodes 611 to 614. The ATM network consist of a plurality of ATM cross-connects 611 to 614 which can provide routing both at the virtual path as well as at the virtual channel level. The flow enforcement functions 601 to 605 are located at the edge of the ATM network to protect the network against potential overloads. This function ensures that no connection violates the conditions that were agreed-to when the connections are set up.

Additional services can be implemented by adding services to one or more of the cross-connect nodes 611 to 614. Within the network of FIG. 6, an exemplary virtual path is illustrated by the wavy line 621 between terminal C and D. A first virtual connection between terminals A and B is illustrated by the dashed line 631 while a second virtual connection is illustrated by the dotted line 632 between terminals C and E.

In addition to the virtual leased line network shown in FIG. 6, other services, such as SMDS/CBDS and frame relay, can easily be added depending upon demand by connecting servers to the ATM nodes within the network. In residential areas, ATM technology can be used to provide new and enhanced entertainment services such as on-demand video to the end user. The flexibility of an ATM network makes it possible to simultaneously support a multitude of services, such as long distance education, home shopping, and games.

Figure 7:
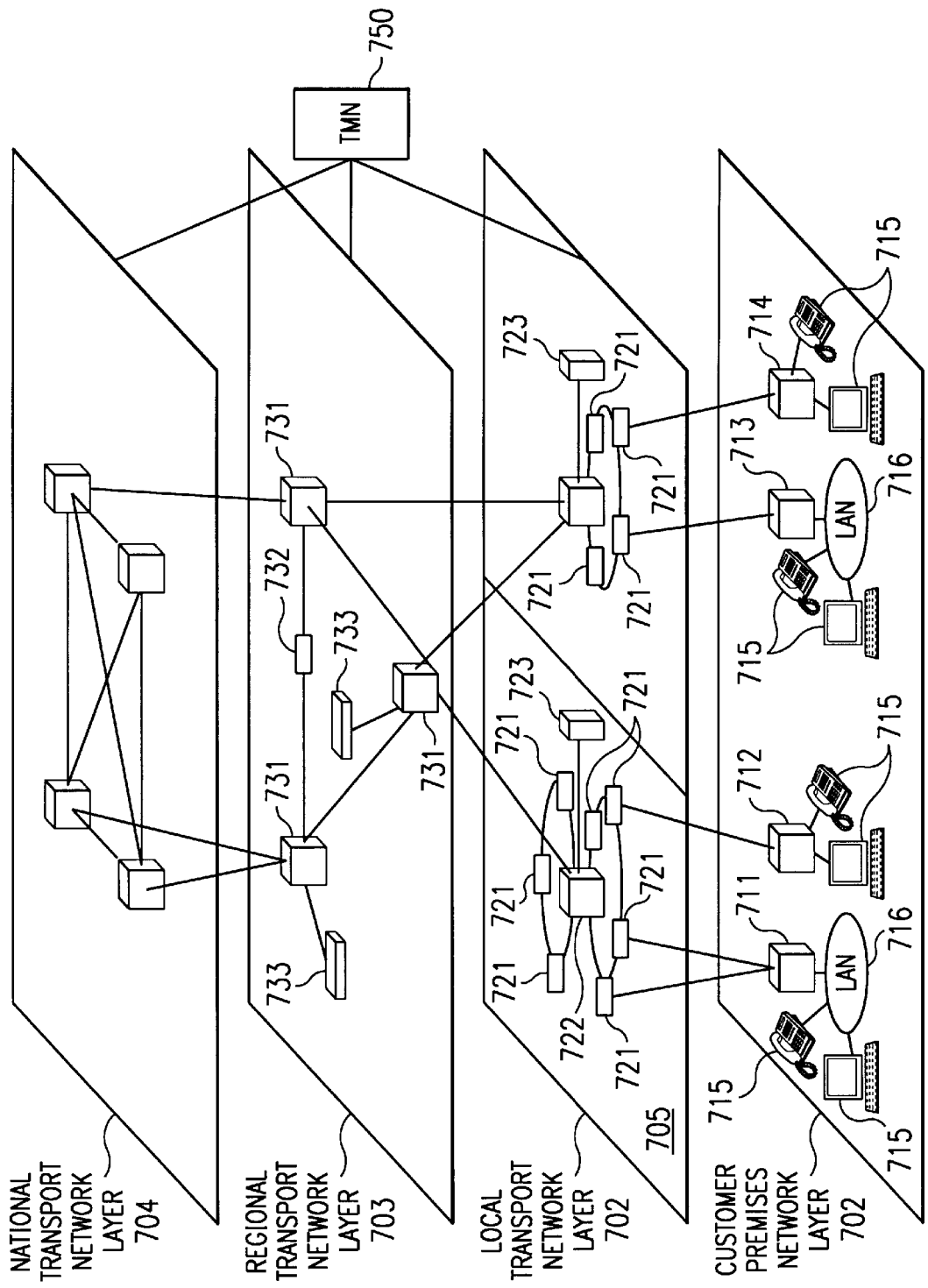
FIG. 7 is a diagram illustrating a multi-layered SDH-based transport network which includes ATM cross-connects.

FIG. 7 illustrates an ATM network that has been overlaid upon a SDH-based layered transport network. The layers include a customer premises network layer 701, a local transport network layer 702, a regional transport network layer 703 and a national transport network layer 704. A plurality of ATM business network nodes 711 to 714 control the flow of data from the customer premises terminals 715 and LANs 716 into respective ones of a plurality of add-drop multiplexers (ADM) 721 serving SDH cross-connect nodes 722 within the local transport network 705. The local cross-connect nodes 722 are in turn coupled through regional cross-connect nodes 731 in the regional transport network, two of which are coupled by add-drop multiplexers 732. Within the local transport network layer 702, a pair of ATM access nodes 723, and SDH rings, comprising the add-drop multiplexers 721, serve the cross-connects 722 and are used for subscriber access with a capacity of up to a full 155 megabits per second, the standardized STM-1 access rate for B-ISDN services.

Existing traffic such as the Plain Old Telephone Service (POTS) can also be carried on this ring network, with remote multiplexers and other access nodes providing the final local-loop connection. The ATM access nodes 723 are shared for access to different services from one location and can include both voice and data using different VP/VCs. In the ATM access nodes 723, ATM traffic is concentrated to make more efficient use of the transport capacity.

The size of an ATM access node can vary, depending upon the capacity required, from a small multiplexer to a large cross-connect. In the regional transport layer 703, ATM cross-connects 733 are used to route traffic between local areas. The use of ATM technology is not visible in the national transport network layer 704, illustrated in FIG. 7. In an ATM overlay network, such as the one illustrated in FIG. 7, services such as frame relay and SMDS/CBDS can be easily added. Functionality for B-ISDN can also be added to both access and regional nodes by adding appropriate software and hardware. As also illustrated in FIG. 7, a network management system 750, such as one operating in accordance with the TMN standard of the CCITT can be implemented to provide the necessary network management functionality to both the SDH and ATM elements of the network.

The management of the ATM network by subsystem 750 may be implemented in accordance with the telecommunications management and operations support (TMOS) family of network management systems provided by Telefonaktiebolaget LM Ericsson, the assignee of the present application. Such network management may include various functionalities such as routing algorithms and congestion control.

Organization of Connection Information in an ATM Exchange

As detailed earlier, the header segment of an ATM cell includes an 8- or 12-bit Virtual Path Identifier (VPI) and a 16-bit Virtual Channel Identifier (VCI). The VPI and the VCI represent the global address of an ATM cell. In one embodiment of the present invention, a database is created inside each ATM exchange which consists of 41-bit records.

Figure 8:
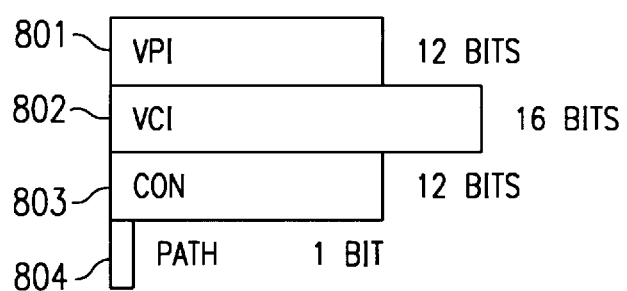
FIG. 8 is a block diagram showing the structure of the data record in one embodiment of the present invention.

The structure of data records within such a database is shown schematically in FIG. 8. Since the memory of most computing devices are organized in groups of eight bits, this 41-bit data record can be physically organized as a 48-bit (i.e., as a 6-octet) record.

As can be seen from FIG. 8, each record in the database comprises a 12-bit VPI portion 801, a 16-bit VCI portion 802, a 12-bit CON portion 803 and a 1-bit PATH 804. TABLE 2 shows the C-syntax description of the structure of each data record.

TABLE 2

```
struct Connection {
    int VPI;
    int VCI;
    int CON;
    int PATH; /* The int PATH contains the bit
                validating the VCI field (when low) */
};
```

©1995 Telefonaktiebolaget L M Ericsson (publ.)

The records in the database are sorted according to the binary value of the VPI field 801 and the VCI field 802, with the VPI field 801 being the most significant. The PATH field 804 is used to indicate whenever multiple virtual channels are part of the same virtual path connection. Whenever the PATH field contains the binary value 1 (i.e., the PATH flag is "asserted"), the VPI value is required to be unique in the database. If the PATH field 804 contains the binary value 0 (i.e., the flag is "cleared"), then the database may contain multiple entries having the same VPI value as long as each such entry has a unique VCI value.

The database is sorted in numerical order. This facilitates the implementation of hardware checks to prevent the addition of illegal entries into the database. Upon startup, all data records are initialized with the hexadecimal values FFF and FFFF in their VPI field 801 and VCI field 802, respectively. Likewise, whenever a record entry is eliminated from the connection table, the VPI and VCI values of that data record are overwritten with these default values after reorganizing the database using a technique described later in this specification. The CON field 803 contains a simplified local address that corresponds to the global address represented by the VPI field 801 and VCI field 802.

The Data Lookup Algorithm

Lookup requests to the connection database in an ATM exchange are executed using a modified binary search algorithm that uses the VPI field 801 (and optional the VCI field 802) as the search key(s) to retrieve the corresponding connection information from the CON field 803.

The operation of the binary search algorithm can be briefly explained as follows: in a sorted database of $2^m$ words, one begins the search by looking first at the word at position $2^{m-1}$. If w, the word one is looking for, matches d, the current retrieved value from the sorted database, the search terminates. If, however, w, the word one is looking for, is smaller than d, the retrieved value, then the search is continued at the location $2^{m-1}-2^{m-2}$. On the other hand, if d is larger than w, then the search is continued at the location $2^{m-1}+2^{m-2}$. This process is iteratively repeated until the address increment becomes less than one, when the search is terminated. The wanted record, w, is assumed to be absent from the database if it is not found within m attempts.

Figure 9:
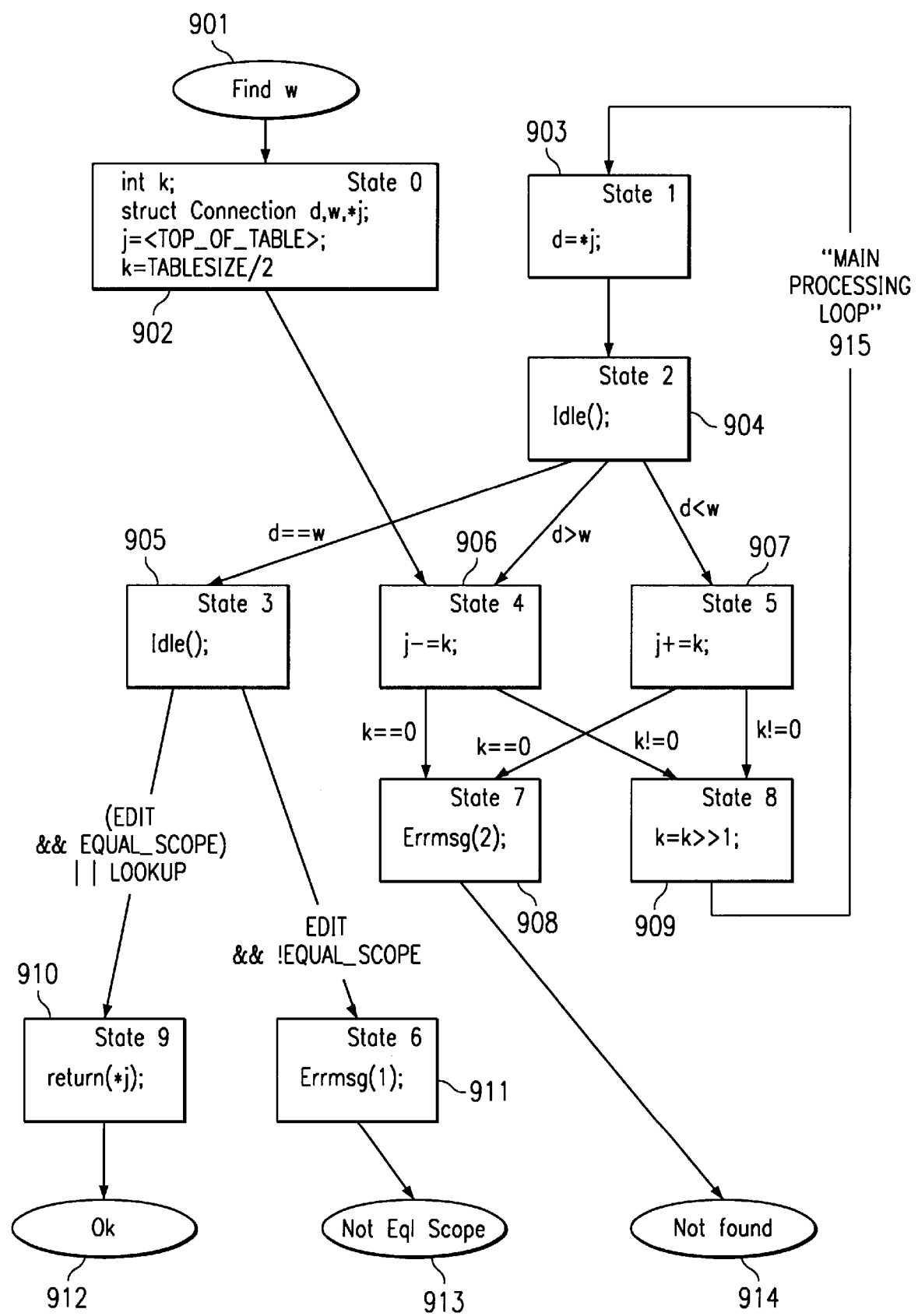
FIG. 9 shows the state machine for the modified binary search algorithm used for executing lookup requests.

FIG. 9 shows the state machine for the modified binary search algorithm used for executing lookup requests. In FIG. 9, j is a variable that points to a data record in the database. The integer variable k represents address increments or decrements at each stage of the search process and is local to the binary search process. In contrast, the variable j is quasi-global variable that may be manipulated by other computing routines inside the ATM exchange processor other than the binary search process. The input variable, w, and the retrieved data record, d, are both structured data types ("structs") of the type Connection, as shown in TABLE 2.

The comparison of d and w is performed using both the VPI and the VCI fields of d and w or using only the VPI fields of d and w depending on the PATH values of d and w. If the PATH flags of either d or w is asserted, then the comparison of d and w is done on the basis of their VPI fields alone.

Whenever the lookup process is used to determine the CON value of an arriving ATM cell "on the fly", only the VPI and VCI values of w will be available. Since the PATH value corresponding to w is not available in such cases, it is set to zero for purposes of executing the lookup process.

When the lookup process is used to take down (i.e., disconnect) a connection, the record entry corresponding to this connection has to be located and removed from the database. In such a case the w value contains the data item to be located in the database and the PATH flag of w (which is received from an upstream system) indicates whether the connection to be taken down is a VP connection (i.e. its PATH value is 1) or a VC connection (i.e. its PATH value is 0). When the PATH flag of w is set to 1, it indicates that the VCI value of w is not important.

The binary search algorithm may also be used to "investigate" an entry. In such a case too, the value of the PATH flag for the input variable w becomes meaningful. Further discussion of this situation is to be found later in this specification. Investigating entries involves many of the same actions as on-the-fly (OTF) lookup. Investigation of entries is sometimes used for verifying the consistency of data entries at the time of initial entry as well as for maintaining the consistency of data. It should be noted that requests for investigation of entries are often accorded lower execution priority than other processes competing for processor cycles, and may sometimes be (temporarily) suspended.

As shown in FIG. 9, the search process starts at 901 when a lookup request to find a data record corresponding to an input variable w is received. At 902, the pointer j is initially set to point to the top of the table and the address increment variable k is initially set to half the size of the table. The search begins at 906 by retrieving the search record at the location corresponding to the value of j as decremented by k. If the increment value k is found to be zero, an error message is generated at 908 and the search terminates at 914. If the value of k is not found equal to zero, then the search proceeds to 909. If the value of k is found greater than one, then the Main Processing Loop 915 of the binary search process is entered and the search jumps to 903 where a data record corresponding to the pointer value j is retrieved from memory.

The current value of d is compared with the input variable w at 904. If d is found equal to w the process jumps to 905. If d is found greater than w the process jumps to 906. If d is found less than w the process jumps to 907.

If d is found less than w at 904, then the pointer j is incremented by current value of the local address increment variable k at 907. If the value of the address increment variable k is not equal to zero, then the search proceeds to 909 and continues as described earlier. However, if the address increment variable k is found equal to zero at 907, then an error message is generated at 908 and the search terminates at 914 as described earlier.

If the data structure variables d and w are found to match at 904, and if the search request is an edit request, then the scope of the variables d and w is compared at 905 on the basis of the PATH flags of d and w. If the search request is an edit request and variables d and w are equal in scope, then the binary search process returns the value of the pointer j at 910 and terminates at 912.

Alternatively, if the search request were a lookup request on an incoming cell and, if d and w are found to match, then the lookup request terminates successfully and the value of CON is returned. If on the other hand the search request is an edit request and the PATH flags of d and w do not match, then d and w are not equal in scope and an error message is generated at 911 and the process terminates at 913.

It should be noted that if the PATH fields 804 of either d or w are found equal to one, then the comparison of d and w is performed using only their VPI fields 801. Whenever a connection needs to be taken down, then the PATH values of d and w need to be equal in scope. The checking of the PATH flag to determine the equality of scope of d and w ensures that a call for disconnecting a VC connection does not result in the removal of a VP connection and vice versa. The return value of the lookup process is *j (i.e., a pointer to the location of the matching record).

In order for the binary search to work properly, all memory values that do not contain data entries corresponding to currently active connections also need to be in sorted order. This is achieved by initializing the entire memory to the binary value "1" and by rewriting abandoned or disused entries with the binary value "1" after bubbling them to the top of the memory. This is equivalent to initializing all VPI fields 801 to the hexadecimal value FFF and all VCI fields 802 to the hexadecimal value FFFF.

The Data Entry Process

Figure 10:
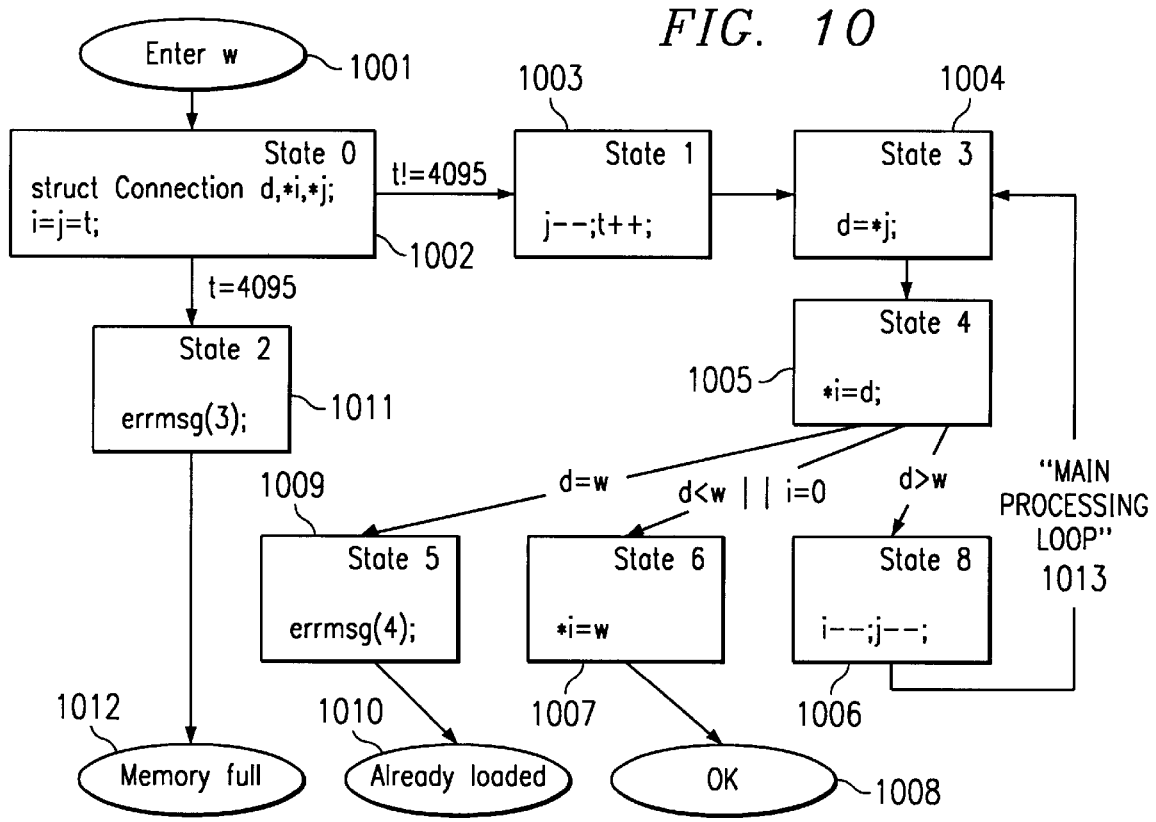
FIG. 10 shows the state machine for the modified bubblesort algorithm used for executing data entry requests.

FIG. 10 shows the state machine for the modified bubblesort process used for executing data entry requests. In a conventional bubblesort algorithm, a data entry can be added anywhere in the database before being "bubbled" up to the correct location. However, in any database (such as a connection database in an ATM exchange) that is organized to be searched using a binary search algorithm, a new entry can not be entered into a database until its final position is determined and room has been created for its entry. Further, the data entry process in an ATM exchange is continually subject to preemption by the data search process.

Thus one needs a dummy placeholder that does not impact on the sorted order of the database while being bubbled to its final spot. This feature is essential since the data entry process may be preempted at any time by a data lookup request. If, the data lookup process is to run properly, then the database constantly needs to be in sorted order. Since the data entry process may be preempted by a data lookup process, the local parameters of the data entry algorithm must be preserved until the interrupted process is resumed.

In the bubblesort entry process illustrated in FIG. 10, i, j, and t are pointers to structured records ("structs" or "records") of the type Connection. The data entry process starts at 1001 when a request to add an entry is received. i and j are local variables of the data entry process that are initialized upon the invocation of the data entry process to point to the same record as t as shown at 1002. t is a quasiglobal variable which points to the first unused location in memory that can be modified by several processes apart from the data entry process. The variable t initially points to an offset of zero from the start of the table.

Upon successful termination, the data entry process either enters the element, or in the case of an error, returns a pointer to the location in memory where the erroneously duplicated data record (that needs to be discarded) is situated. Since one embodiment of the connection information database in an ATM exchange allocates 12 bits of each data record to the CON field 803, the maximum size of the database is 4096 records numbered 0, 1, 2 . . . 4095. At 1003, the pointer j is decremented by one and the pointer t is incremented by one. At 1004, a data entry corresponding to the pointer value j is retrieved from memory and stored in d.

At 1005, this value stored in d is first written to address i. Then the d-value stored in the database at the address i is compared with the input variable w. If d is found greater than w, the pointers i and j are decremented by one at 1006 and the process jumps back to 1004 following the Main Processing Loop 1013. If d is found less than w or if the pointer i is found equal to zero, then the input variable w is written to address i at 1007 and the process ends at 1008. If the values of d and w are found to match at 1005, an error message is generated at 1009 and the invoking process is informed at 1010 that the input variable is already loaded in memory.

If the value of t reaches 4095, then an error message is generated at 1011 that informs the invoking process at 1012 that the memory is full and that no more connections can be established in the database unless and until some existing connections are released or discarded. This is because the CON field 803 is 12-bits wide in one embodiment of the present invention and thus, the database can have no more than 4096 entries. In general, an error condition is triggered at 1011 if the value of t sets a preset maximum value that is related to the size of the connection database. This procedure of insertion is what the inventor herein calls 'a modified bubblesort algorithm'.

An Illustrative Example of the Data Entry Process

FIG. 11 illustrates the stages in the data entry sequence for a database containing six data records. Since the database contains six data entries, the value of the variable t is six just prior to the entry of a seventh data record. Assume that a seventh data item w, with VPI, VCI and PATH values of 5COh, 001h and 0h respectively, is to be added to the database. Since the PATH value of the new data item w is zero, this new connection is a VC connection.

The algorithm first enters the state s0 wherein the pointers i and j are set equal to t as shown at 1002. FIG. 11(*a*) shows the organization of the database after the algorithm goes through the states s0, s1, s3 and s4, i.e., after the pointer j has been decremented at 1003, the pointer t has been incremented at 1003, and the contents of database record 5 have been read at 1004 and copied to address location 6 at 1005.

FIG. 11(*b*) shows the organization of the database following state s4 after one full round of the Main Processing Loop 1013 of FIG. 10. As shown in FIG. 10, a plain copy of the data record is made while preserving the sorted order of the database. The data entry process continues along the Main Processing Loop 1013 until i points to zero or until both i and j point to data items that are smaller than w. The comparison of d and w is done after the data entry process enters state s4, i.e., at 1005 of FIG. 10. The method of comparison is based on the contents of the PATH flag as described earlier in the specification. If the data entry d is found to be smaller than w, the data entry process enters the state s6 as shown at 1007 of FIG. 10. The organization of the database now looks as shown in FIG. 11(*c*). The state machine now enters the new item w into the database at address i overwriting the bubbled-up duplicated entry at that position. The organization of database at the end of the data entry process is shown in FIG. 11(*d*).

One of the principal advantages of this data entry technique is that the data entry process is interruptible and permits a successful binary search for any of the items in the database after such an interruption. The number of cycles that the algorithm state machine spends in the Main Processing Loop 1013 of FIG. 10 is dependent on the final location of the data item and upon how full the database is initially.

On the average, it will take 1.5t+4 cycles to determine the final location of a new data item. If all machine cycles are assumed to be equally long and further assumed to be dependent upon the access time of commercially-available semiconductor memory (e.g., 50 nanoseconds) then for an initial database of 4000 entries, the mean entry access time can be computed as 50*(1.5*4000+4) nanoseconds, i.e., 300 microseconds ($\mu$s).

This figure can be improved upon by using faster memory. However it should be noted that the access time in practice may be slower than the computed figure of 300 $\mu$s if the data entry process is interrupted by other processes having higher priority. It should be noted that the disconnection process too places a similar computational load on the processor as the data entry process and is likely to be, on the average, as active as the data entry process.

The Data Removal Process

Figure 12:
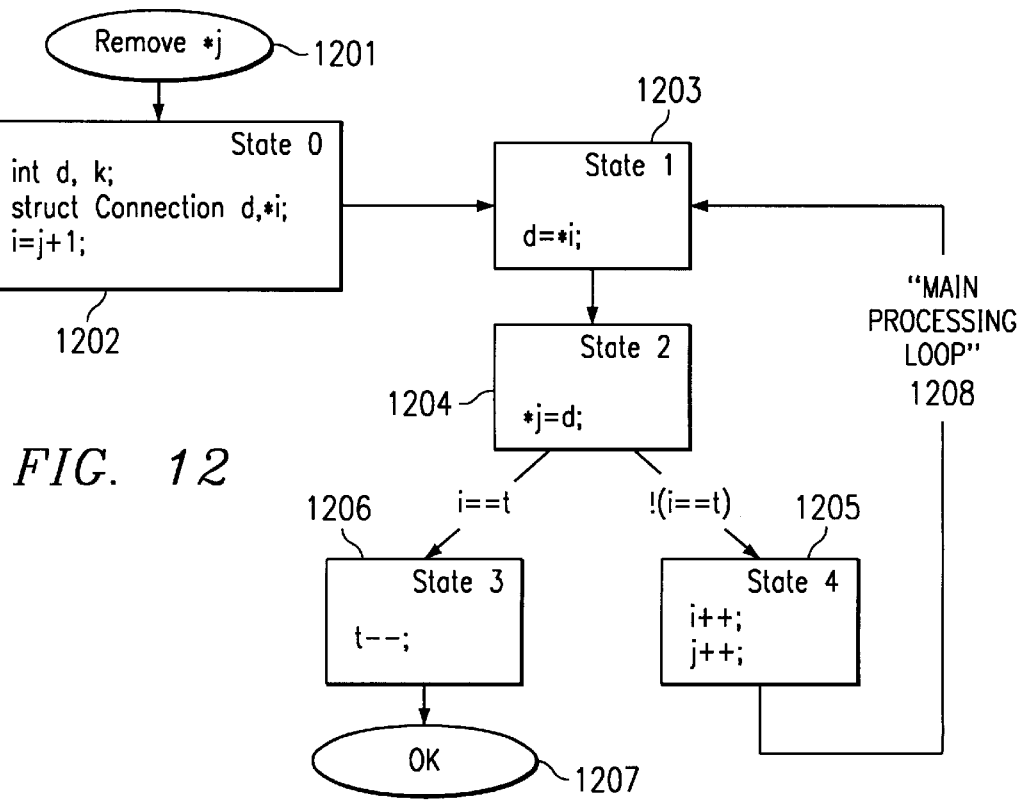
FIG. 12 shows the state machine for the modified bubblesort algorithm used for executing data removal requests.

FIG. 12 shows the state machine for the modified bubblesort process used for executing data removal requests. Like the data entry process, the data removal process is also a variant of the bubblesort technique wherein data entries that are to be discarded are successively overwritten until the process reaches the top of the memory in use.

The process starts as shown at 1201 in FIG. 12 with a request to remove an entry corresponding to a pointer value j. i, j, and t are pointers to structured data records ("structs") of the type Connection. i and j are variables local to the data removal process while the variable t is quasi-global. The variable t can be modified by other processes such as the data entry and the initialization processes. The variable t points to the lowest unused location in memory and initially points to an offset of zero from the start of the table.

The variable d is the register that is used to temporarily store data records. The data record to be removed is first identified using the lookup process or by the failure of the data entry process, both of which yield the pointer *j. This pointer *j is used as the input to the data removal process state machine as shown at 1201. At 1202, an auxiliary variable i is initialized with the value j+1 and the data record at location *i is copied to the location *j as shown at 1203 and 1204 using the register d as intermediate storage. If the top of the table has not been reached, the process enters state s4 wherein the variables i and j are both incremented by one, as shown at 1205.

The process continues along the Main Processing Loop 1208 shown in FIG. 12 to state s1 and repeats steps 1203 and 1204 until the pointer i points to the top of the in-use section of the table. When i is found equal to t, the process enters state s3, and results in the value of t being decremented by one at 1206. The data removal process signals successful completion of the process by issuing a confirmation to the invoking process at 1207. The requirement that the database always remain in a sorted order is satisfied by the bubblesort data removal process illustrated in FIG. 12.

Interleaved Operation of Lookup, Entry and Removal Process

The input to the data removal process is a pointer to the data entry that needs to be removed. In order to obtain this starting value, another process such as the binary search process needs to be executed on the database.

The data removal process may also be initiated by the failure of the data entry process. This can happen as shown in FIG. 10 if the data entry process state machine reaches state s5 in step 1009 and exits with an error message at 1010. If the data entry algorithm exits through state s5, the database needs to be reorganized since the pointers i and j point to two adjacent duplicative entries in the database at the moment of exit and since all valid data at higher locations in memory have been shifted up by one position. It should be emphasized that this situation does not affect the efficiency of the lookup process as it only results in an address location being used up unnecessarily.

If the data entry process reaches the state s5, the data entry process can then be run in order to restore the database to the state it was in prior to the failed attempt to add a new data entry. In such a case the output *j of the data entry process is fed back as an input to the data removal process. Since such failed attempts to add data entries waste processing time, they can be avoided entirely if a search is performed before the start of the data entry or by having the software verify data prior to attempting entry.

Investigation of the correctness of data to be entered is thus useful to the efficient operation of a connection database in an ATM exchange. Safeguarding against the corruption of database entries can be done either in hardware or in software. In one embodiment of the present invention, it is assumed that very few of the connections that are sought to be entered will fail, and therefore software checking at entry time is deemed sufficient. However this design choice requires a memory restoration process whenever an error occurs. The need for this cumbersome correction process can be avoided by implementing stricter checks on the entry of data records.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. A method of managing a connection information database in the exchange portion of an asynchronous transfer mode (ATM) system, said method comprising the steps of:
   mapping the global address of an ATM cell to a local address that is specific to the ATM exchange;
   looking up entries in the connection information database of the exchange portion using a binary search algorithm;
   adding data entries to the database using a bubblesort algorithm which has been modified, said modification of the bubblesort algorithm being to move a dummy data record to the appropriate location in the database while maintaining the connection information including any dummy records in said database in a fully sorted order; and
   deleting data entries from the database using a bubblesort algorithm which has been modified, said modification of said bubblesort algorithm being to delete data entries while maintaining the connection information including any deleted records, in said database in a fully sorted order.

2. The method of claim 1 wherein the global address of an ATM cell header used in said ATM system comprises a 12-bit Virtual Path Identifier (VPI) portion and a 16-bit Virtual Channel Identifier (VCI) portion.

3. The method of claim 1 wherein the global address of an ATM cell header used in said ATM system comprises an 8-bit Virtual Path Identifier (VPI) portion and a 16-bit Virtual Channel Identifier (VCI) portion.

4. The method of claim 1 wherein the local address of an ATM cell used in said ATM system includes a 12-bit connection (CON) value.

5. The method of claim 1 wherein the local address of an ATM cell used in said ATM system additionally identifies data entries having unique VPI values.

6. The method of claim 5 wherein the identification of data entries having unique VPI values is performed using a binary flag.

7. The method of claim 1 wherein the step of data deletion takes as its input a pointer to the data entry being deleted, said pointer being generated by a search algorithm.

8. The method of claim 7 wherein the search algorithm is a binary search algorithm.

9. The method claim 1 wherein the step of data deletion takes as its input a pointer to the data entry being deleted, said pointer being automatically generated upon the failure of the data entry algorithm.

10. The method of claim 1 wherein the local address of an ATM cell used in said ATM system is generated from the global address using a hash function.

11. A method of managing a connection information database in the exchange portion of an asynchronous transfer mode (ATM) system, said method comprising the steps of:
   mapping the global address of an ATM cell used in said ATM system to a local address that is specific to the ATM exchange;
   using a binary search algorithm to look up entries in the database;
   adding data entries to the database while maintaining the database in a fully sorted order, and
   deleting data entries from the database while maintaining the database in a fully sorted order.

12. The method of claim 11 wherein the step of adding data entries to the database is performed using a bubblesort algorithm.

13. The method of claim 11 wherein the step of deleting data entries from the database is performed using a bubblesort algorithm.

14. A management system for managing a connection information database in the exchange portion of an asynchronous transfer mode (ATM) system, said management system comprising:
   means for mapping the global address of an ATM cell used in said ATM system to a local address that is specific to the ATM exchange;
   means for looking up connection entries in the database using a binary search algorithm;

means for adding data entries to the database using a bubblesort algorithm which has been modified, said modification of the bubblesort algorithm being to move a dummy data record to the appropriate location in the database while maintaining the database including any dummy records in a fully sorted order; and means for deleting data entries from the database using a bubblesort algorithm which has been modified, said modification to said bubblesort algorithm being to delete data entries while maintaining the database in a fully sorted order.

15. The system claim 14 wherein the global address of an ATM cell header used in said ATM system comprises a 12-bit Virtual Path Identifier (VPI) portion and a 16-bit Virtual Channel Identifier (VCI) portion.

16. The system of claim 14 wherein the global address of an ATM cell header used in said ATM system comprises an 8-bit Virtual Path Identifier (VPI) portion and a 16-bit Virtual Channel Identifier (VCI) portion.

17. The system of claim 14 wherein the local address of an ATM cell used in said ATM system includes a 12-bit connection (CON) value.

18. The system of claim 14 wherein the local address of an ATM cell used in said ATM system additionally identifies data entries having unique VPI values.

19. The system of claim 18 wherein the identification of data entries having unique VPI values is performed using a binary flag.

20. The system of claim 14 wherein the means for performing the data deletion comprises means to take as an input a pointer to the data entry being deleted, said pointer being generated by a search algorithm.

21. The system of claim 20 wherein the search algorithm is a binary search algorithm.

22. The system of claim 14 wherein the means for performing the data deletion comprises means to take as an input a pointer to the data entry being deleted, said pointer being automatically generated upon the failure of the data entry algorithm.

23. The system of claim 14 wherein the local address of an ATM cell used in said ATM system is generated from the global address using a hash function.

24. A management system for managing a connection information database in the exchange portion of an asynchronous transfer mode (ATM) system, said management system comprising:

means for mapping the global address of an ATM cell used in said ATM system to a local address that is specific to the ATM exchange;

means for looking up entries in the connection database of said exchange portion, using a binary search algorithm;

means for adding data entries to the database while maintaining the database in a fully sorted order; and means for deleting data entries from the database while maintaining the database in a fully sorted order.

25. The system of claim 24 wherein the means for adding data entries to the database additionally comprises a bubblesort algorithm.

26. The system of claim 24 wherein the means for deleting data entries from the database additionally comprises a bubblesort algorithm.

* * * * *